(12) United States Patent
Srinivasan et al.

(10) Patent No.: US 9,092,855 B2
(45) Date of Patent: Jul. 28, 2015

(54) METHOD AND APPARATUS FOR REDUCING NOISE INTRODUCED INTO A DIGITAL IMAGE BY A VIDEO COMPRESSION ENCODER

(71) Applicant: MARVELL WORLD TRADE LTD., St. Michael (BB)

(72) Inventors: Sujith Srinivasan, Bangalore (IN); Byas Muni, Jharkhand (IN); Sanjay Garg, Bangalore (IN)

(73) Assignee: MARVELL WORLD TRADE LTD. (BB)

( * ) Notice: Subject to any disclaimer, the term of this patent is extended or adjusted under 35 U.S.C. 154(b) by 0 days.

(21) Appl. No.: 14/064,753

(22) Filed: Oct. 28, 2013

(65) Prior Publication Data

US 2014/0056537 A1 Feb. 27, 2014

Related U.S. Application Data

(63) Continuation of application No. 12/555,960, filed on Sep. 9, 2009, now Pat. No. 8,571,347.

(60) Provisional application No. 61/095,466, filed on Sep. 9, 2008.

(51) Int. Cl.
*G06T 5/00* (2006.01)
*H04N 19/176* (2014.01)
(Continued)

(52) U.S. Cl.
CPC ............... *G06T 5/002* (2013.01); *G06T 5/003* (2013.01); *H04N 19/117* (2014.01); *H04N 19/14* (2014.01);
(Continued)

(58) Field of Classification Search
None
See application file for complete search history.

(56) References Cited

U.S. PATENT DOCUMENTS 5,852,475 A * 12/1998 Gupta et al. .................. 348/606
6,188,799 B1   2/2001 Tan et al.
(Continued)

FOREIGN PATENT DOCUMENTS

EP   1 549 075 A2   6/2005
EP   1 553 778 A1   7/2005
(Continued)

OTHER PUBLICATIONS

Gao W., et al: "Real-Time Video Posting Processing for Deblocking and Deringing on Media Processors" International Journal of Imaging Systems and Technology, Wiley and Sons, New York, vol. 13, Jan. 1, 2003 pp. 161-168, XP007901347.
(Continued)

*Primary Examiner* — Tsung-Yin Tsai

(57) ABSTRACT

Devices, systems, methods, and other embodiments associated with reducing digital image noise are described. In one embodiment, a method includes filtering a digital image with a plurality of adaptive filters, wherein the plurality of adaptive filters include a first filter configured to filter noise surrounding one or more edges in the digital image, and a second filter configured to filter noise caused by a block based encoding of the digital image. The method further includes reducing a compression artifact from selected pixels in the digital image, wherein the compression artifact is reduced by (i) combining an output from the first filter and an output from the second filter in response to the digital image being determined to be blocky, and (ii) not combining the output from the first filter with the output of the second filter in response to the digital image not being determined to be blocky.

9 Claims, 14 Drawing Sheets

(51) Int. Cl.
*H04N 19/172* (2014.01)
*H04N 19/117* (2014.01)
*H04N 19/14* (2014.01)
*H04N 19/17* (2014.01)
*H04N 19/86* (2014.01)

(52) U.S. Cl.
CPC ............ *H04N 19/17* (2014.01); *H04N 19/172* (2014.01); *H04N 19/176* (2014.01); *H04N 19/86* (2014.01); *G06T 2207/10016* (2013.01); *G06T 2207/20012* (2013.01)

(56) References Cited

U.S. PATENT DOCUMENTS

| | | | |
|---|---|---|---|
| 6,360,024 | B1 | 3/2002 | Tan et al. |
| 7,003,174 | B2 * | 2/2006 | Kryukov et al. ............ 382/266 |
| 7,174,091 | B2 | 2/2007 | Umeda |
| 7,215,823 | B2 | 5/2007 | Miura et al. |
| 7,415,163 | B2 | 8/2008 | Nishi et al. |
| 7,426,313 | B2 | 9/2008 | Shohdohji |
| 7,432,986 | B2 | 10/2008 | Winger |
| 8,064,718 | B2 * | 11/2011 | Pedersen ...................... 382/275 |
| 8,098,951 | B2 * | 1/2012 | Su et al. ...................... 382/261 |
| 8,139,883 | B2 * | 3/2012 | Zhang et al. ................. 382/254 |
| 8,331,717 | B2 | 12/2012 | Hou et al. |
| 8,363,728 | B2 * | 1/2013 | Zhang et al. ............... 375/240.2 |
| 2002/0080882 | A1 | 6/2002 | Kitagawa |
| 2003/0021489 | A1 | 1/2003 | Miura et al. |
| 2003/0053708 | A1 * | 3/2003 | Kryukov et al. ............ 382/261 |
| 2005/0100235 | A1 * | 5/2005 | Kong et al. ................. 382/261 |
| 2005/0117036 | A1 | 6/2005 | Nishi et al. |
| 2006/0050783 | A1 | 3/2006 | LeDinh et al. |
| 2006/0104538 | A1 | 5/2006 | Izumi |
| 2006/0171466 | A1 | 8/2006 | Schoner et al. |
| 2006/0171467 | A1 | 8/2006 | Schoner |
| 2006/0245499 | A1 | 11/2006 | Chiu et al. |
| 2006/0245506 | A1 | 11/2006 | Lin et al. |
| 2007/0076972 | A1 | 4/2007 | Chiu |
| 2007/0160151 | A1 | 7/2007 | Bolton et al. |
| 2007/0285729 | A1 | 12/2007 | Wada |
| 2008/0152017 | A1 | 6/2008 | Vendrig et al. |
| 2008/0175512 | A1 | 7/2008 | Ohira |
| 2009/0060370 | A1 * | 3/2009 | Pedersen ...................... 382/261 |
| 2010/0061649 | A1 | 3/2010 | Hou et al. |

FOREIGN PATENT DOCUMENTS

| | | |
|---|---|---|
| EP | 1 928 182 A2 | 6/2008 |
| JP | 2007-336075 | 12/2007 |
| WO | WO 2006089557 A1 * | 8/2006 |
| WO | 2007072301 A2 | 6/2007 |

OTHER PUBLICATIONS

Hyun Wook Park, et al.: "A Postprocessing Method for Reducing Quantization Effects in Low Bit-Rate Moving Picture Coding" IEEE Transactions on Circuits and Systems for Video Technology, IEEE Service Center, Piscataway, NJ vol. 19, No. 1, Feb. 1, 1999, pp. 161-171, XP011014543.

* cited by examiner

METHOD AND APPARATUS FOR REDUCING NOISE INTRODUCED INTO A DIGITAL IMAGE BY A VIDEO COMPRESSION ENCODER

CROSS REFERENCE TO RELATED APPLICATIONS

This patent disclosure is a continuation of U.S. patent application Ser. No. 12/555,960 filed on Sep. 9, 2009 (now U.S. Pat. No. 8,571,347), which claims benefit under 35 USC §119(e) to U.S. Provisional Application No. 61/095,466 filed on Sep. 9, 2008, which is hereby wholly incorporated by reference.

BACKGROUND

Video compression is used in a variety of current and emerging products. Video compression is used in digital television set-top boxes, digital satellite systems, high definition television (HDTV) decoders, digital versatile disk (DVD) players, video conferencing, and other digital video applications. Video compression allows images of video content to be compressed by removing non-essential features of the video content. Compressing video content reduces the storage area needed to store the content. Compressed video content may be transmitted faster than un-compressed video content.

Image compression standards used in the consumer electronics industry are block based. One example of a block based compression standard is the Advanced Video Coding (AVC)/H.264 standard developed by the International Telecommunication Union (ITU) in cooperation with the International Standards Organization (ISO). Block based video compression typically introduces artifacts including block noise and mosquito noise into image data. Artifacts are produced as a result of quantization of the imaged data performed in a video compression encoder. These artifacts are common in low bit rate image data. The artifacts also occur occasionally in good quality material like blue ray encoded film. A person viewing a video composed of digital images can sometimes detect these artifacts. The large size of modern displays allows people viewing images to detect more block noise and mosquito noise than when viewing images with traditionally smaller displays. A better way to reduce digital image noise is desirable.

SUMMARY

In one embodiment of the disclosure, a method includes filtering a digital image with a plurality of adaptive filters, wherein the plurality of adaptive filters include a first filter configured to filter noise surrounding one or more edges in the digital image, and a second filter configured to filter noise caused by a block based encoding of the digital image. The method further includes reducing a compression artifact from selected pixels in the digital image, wherein the compression artifact is reduced by (i) combining an output from the first filter and an output from the second filter in response to the digital image being determined to be blocky, and (ii) not combining the output from the first filter with the output of the second filter in response to the digital image not being determined to be blocky.

Another aspect of the disclosure includes an apparatus. The apparatus includes filter logic configured to filter a digital image to produce at least one of, a 2-dimensional (2D) mosquito filter output, a 2D block filter output, a 1-dimensional (1D) horizontal block filter output, and a 1D vertical block filter output; selection logic configured to select, based at least in part, on an amount of mosquito noise and an amount of block noise determined from the digital image, a correction filter output to apply from the filter logic, wherein (i) the correction filter output is selected as a combination of the 2D mosquito filter output and the 2D block filter output when the digital image is determined to be blocky across the digital image based at least in part on the amount of block noise in the digital image, and (ii) the correction filter output is selected as a combination of the 1D horizontal filter output and the 1D vertical filter output when the digital image is determined to not be blocky across the digital image based at least in part on the amount of block noise in the digital image; and compression artifact logic configured to reduce a compression artifact in the digital image based, at least in part, on the correction filter output.

Another aspect of the disclosure includes an apparatus. The apparatus includes a plurality of adaptive filters including at least a first filter configured to filter noise surrounding one or more edges in the digital image, and a second filter configured to filter noise caused by a block based encoding of the digital image. The apparatus further includes compression artifact logic configured to reduce a compression artifact from selected pixels in the digital image, wherein the compression artifact is reduced by (i) combining an output from the first filter and an output from the second filter in response to the digital image being determined to be blocky, and (ii) not combining the output from the first filter with the output of the second filter in response to the digital image not being determined to be blocky.

In another aspect, the plurality of adaptive filters further include a 1-dimensional (1D) horizontal block filter and a 1-dimensional (1D) vertical block filter; and wherein the first filter is a 2-dimensional (2D) mosquito filter and the second filter is a 2-dimensional (2D) block filter, wherein each filter is configured to provide a correction filter output as a result of filtering the digital image.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
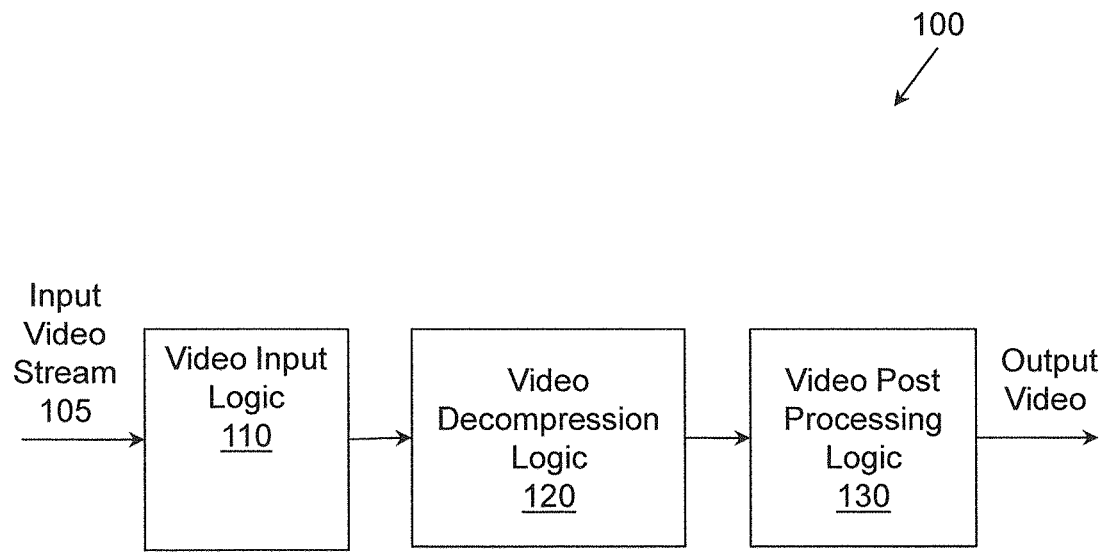
FIG. 1 illustrates one embodiment of a system associated with processing video data.

Described herein are example systems, methods, and other embodiments associated with reducing digital video image noise. In one embodiment, a method reduces the block noise and mosquito noise of compressed digital video images. The method may be a post processing technique that does not require information from the video decoder. In another embodiment, the method is an inline process that removes block noise as digital image data is being decompressed. Digital image data that contains no artifacts are preserved. Even though traditional methods clean noisy material, the traditional methods are not adaptive because portions of good digital images are smoothed and blurred in the filtering process.

In one embodiment, mosquito noise is reduced by filtering pixels near flat areas. Flat areas are areas where pixel values do not change significantly between adjacent pixels. Flat areas are determined near strong directional edges. The mosquito noise is detected by a ringing detector detecting significant changes in pixels values at flat areas near strong directional edges.

Block noise may be reduced by filtering an entire block grid when a block grid is detected. The block grid is detected by analyzing and grouping pixel level block boundary detections into different phases. A phase indicates where block boundaries occur at periodic intervals.

Based in part on the grid, edge adaptive filters may be used to filter the mosquito noise and the block noise. Edge adaptive filters find areas likely to be corrupted by noise. Edge adaptive filters are capable of filtering the noise without filtering a block edge. In one embodiment, the level of filtering is proportional to the noise level. Edge adaptive filters help to preserve true image features by not filtering portions of images that are unlikely to contain noise. In this manner, some portions of an entire image or frames of images are filtered and other portions are not filtered. Thus, true image features can be preserved in the unfiltered portions.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to the phrase "based on", "based in part", "based, at least in part," and so on, indicate that an action may be based on the associated condition(s) alone or along with other conditions or actions not listed.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read. Computer-readable as described herein is limited to statutory subject matter under 35 U.S.C. §101.

"Logic", as used herein, includes but is not limited to hardware, firmware, non-transitory computer-readable medium with stored instructions, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. Logic as described herein is limited to statutory subject matter under 35 U.S.C. §101.

Overview

FIG. 1 illustrates one embodiment of a system 100 that is capable of processing video data. The system 100 receives an input video stream 105 into video input logic 110. The input may be in the form of individual frames and may be compressed. The input may be compressed macroblocks. The macroblocks may be composed of other smaller blocks according to an H.264 standard, a motions picture experts group (MPEG) standard, or another compression standard. The video input logic 110 stores video input data, reorders frames of data, and prepares the video input for processing by video decompression logic 120.

The video decompression logic 120 is configured to decompress compressed video data. In one embodiment, the video data is decompressed by applying an inverse transform of the function used to compress the video data. The compression/decompression algorithm may be lossy. In a lossy compression standard, there is some loss of image quality when the video data is decompressed.

A compression algorithm may be used to encode portions of an image. Portions of the image that a human eye is sensitive to notice may be encoded with higher resolution than portions of an image the human eye is not as sensitive to noticing. For example, a flower may be encoded with more resolution than a region of a blue sky. The human eye may detect boundaries of the blocks used to encode the video data. These detectable boundaries are called block noise. Mosquito noise may also be injected into the image during a block based compression. Logic, methods, and systems discussed below are able to reduce block and mosquito noise inline either with the decompression process or after the image has been decompressed, or both.

Video post processing logic 130 is configured to prepare the input video for rendering. The video post processing logic 130 schedules decompressed frames for rendering. The video post processing logic 130 produces output video in a displayable format. In some embodiments, the block and mosquito noise is removed post decompression by the video post processing logic 130. Noise may be removed from digital images, digital video images, non-video image data, or other types of image data.

Figure 2:
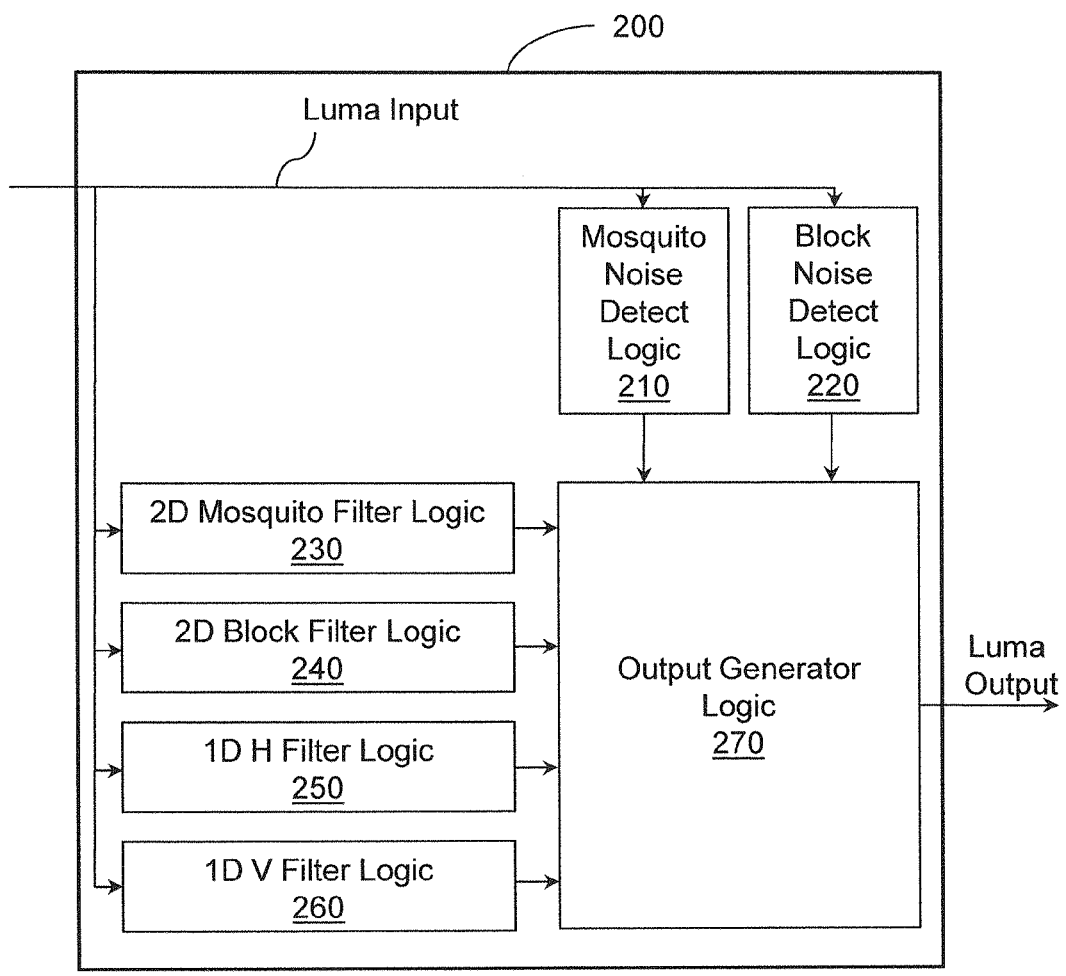
FIG. 2 illustrates one embodiment of an apparatus associated with reducing digital image noise.

FIG. 2 illustrates an embodiment of an apparatus 200 for reducing digital image noise. The apparatus 200 adaptively removes mosquito noise and block noise artifacts from digital images. Mosquito noise detect logic 210 and block noise detect logic 220 form a control path of the apparatus 200. The apparatus 200 comprises 2-dimensional (2D) mosquito (MQ) filter logic 230, 2D block filter logic 240, 1-dimensional (1D) Horizontal (H) filter logic 250, and 1D vertical (V) filter logic 260 in an input datapath, which may be referred to collectively as "the filters in the datapath". The filters in the datapath filter a luma input received by the apparatus 200. On a pixel by pixel basis, output generator logic 270 blends the filter outputs together to generate a luma output based, at least in part, on whether mosquito and/or block noise is detected. The luma input corresponds to an array of pixel values representing a digital image. The apparatus 200 filters the luma input for block and mosquito noise for pixels of the digital image.

In one embodiment, the mosquito noise detect logic 210 identifies pixels that are affected by mosquito noise and filters those pixels using an edge adaptive filter. The block noise detect logic 220 finds the block boundaries in an input frame and statistically organizes the block boundaries into different phases with phase counts. Based, at least in part, on the phase counts, the input frame is classified as being blocky or not blocky. Blocky frames may be filtered based on various programmable options. The block noise detect logic 220 and the mosquito noise detect logic 210 may be configured to operate in tandem or in parallel.

The mosquito noise detect logic 210 generates a multi-bit representation of the amount of mosquito noise per pixel. In one embodiment, the block noise detect logic 220 generates a three-bit signal. For example, a horizontal bit indicates that a horizontal block boundary is detected, a vertical bit indicates that a vertical block boundary is detected, and a global bit indicates a global filtering mode. The global bit indicates the input frame is very blocky and that the whole frame should be filtered. In one embodiment, the horizontal bit and the vertical bit are ignored when the global bit is set. The output generator logic 270 computes a luma output based, at least in part, on the signals from the control path and the outputs from the four filters in the datapath. Other amounts of bits and signals can be implemented.

Filters

With continued reference to FIG. 2, 2D mosquito filter logic 230 and 2D block filter logic 240 are two dimensional edge adaptive filters, in one embodiment. The 2D mosquito filter logic 230 filters pixels affected by mosquito noise and the 2D block filter logic 240 filters pixels with block noise. 2D mosquito filter logic 230 and 2D block filter logic 240 each have programmable thresholds and kernel sizes. 1D H filter logic 250 and 1D V filter logic 260 operate in horizontal and vertical directions. The 1D horizontal filter logic 250 and the 1D vertical filter logic 260 filter horizontal and vertical block boundaries, respectively. 2D mosquito filter logic 230, 2D block filter logic 240, 1D H filter logic 250, and 1D V filter logic 260 can be used in linear or edge adaptive modes and can be programmed to use various sets of coefficients and thresholds.

Mosquito Noise Detection

Figure 3:
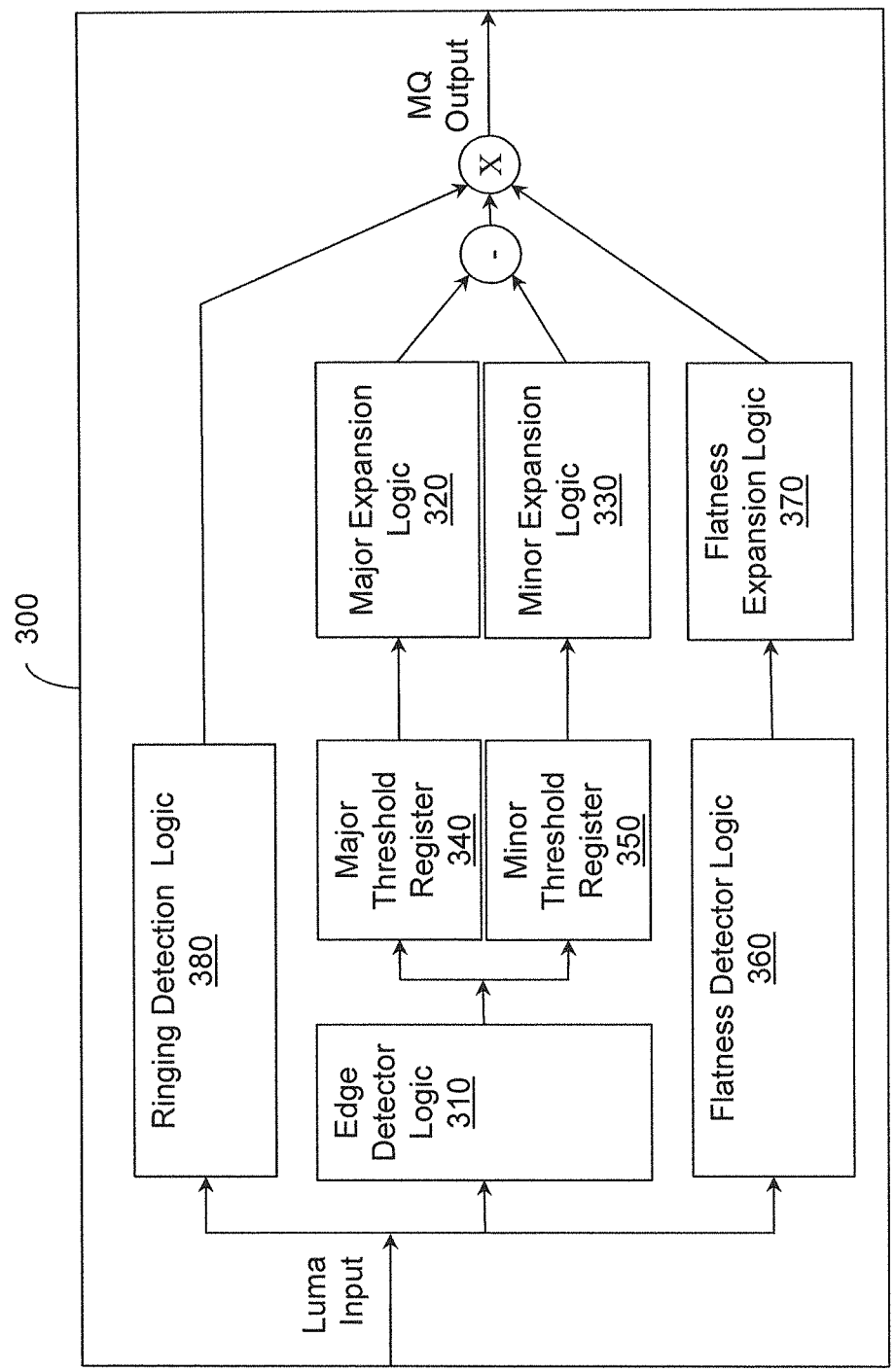
FIG. 3 illustrates one embodiment of a logic associated with detecting mosquito noise.
Figure 4:
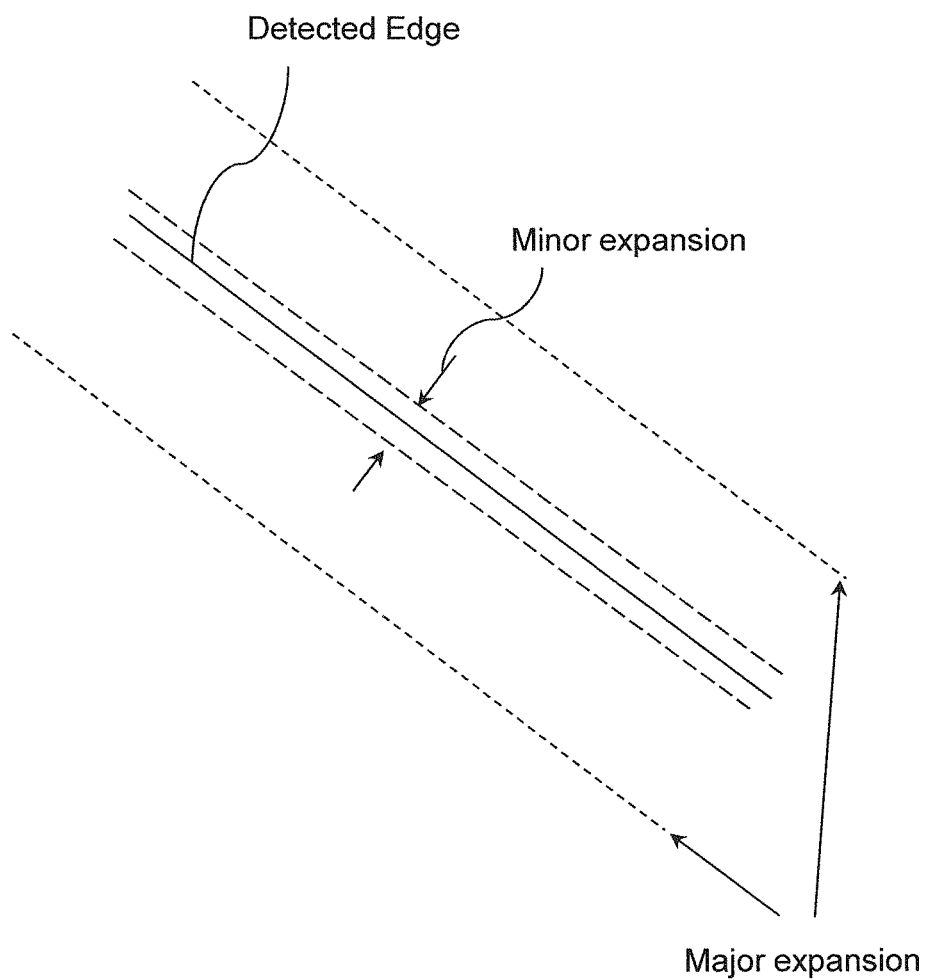
FIG. 4 illustrates one example of expanding an edge to determine a region around the edge.

FIG. 3 illustrates an embodiment of mosquito noise detect logic 300. The mosquito noise detect logic 300 identifies strong directional edges with edge detector logic 310 and creates a band around those edges. An example of a detected edge is shown in FIG. 4. In one embodiment, the edge detector logic 310 is an edge filter with four directional edge detector masks. The masks are run over the image and the maximum of the four outputs is compared to a programmable threshold to determine whether a pixel is part of an edge represented by an edge map. The edge map is comprised of binary values where a 1 indicates that the current pixel lies on a detected edge. Other numbers of masks can be implemented.

Once the edge map is found, the edge map is expanded into regions on both sides of each edge. The edge map may be expanded to detect noise in regions near a detected edge. Major expansion logic 320 creates one edge map and minor expansion logic 330 creates a second edge map. One example of major expansions and minor expansions are shown in FIG. 4. The magnitude of the major expansion and the magnitude of the minor expansion may be determined by values in a major threshold register 340 and values in a minor threshold register 350. In one embodiment, the major expansion logic 320 and the minor expansion logic 330 expand the detected edge up to +/−7 pixels in the horizontal direction and +/−3 pixels in the vertical direction.

The difference between the edge map expanded by the major expansion logic 320 and the edge map expanded by the minor expansion logic 330 yields the final edge map. Pixels within the final edge map are identified as candidate pixels that may contain mosquito noise. The double expansion creates a band around a detected edge. The search for mosquito noise is conducted in this band. The minor expansion excludes pixels in the detected edge from the mosquito noise search to prevent those pixels from being filtered. Filtering pixels in a detected edge typically leads to overall image softening.

Mosquito noise is detected in flat regions of a digital image that are near strong directional images. Flat regions are areas where pixel values change little between adjacent pixels. For example, the picture of a cloudless sky is flat. A cloudless sky image would be an image of light blue pixels. The pixels form a flat region because the pixel values change little from pixel to pixel. It is not generally possible to detect mosquito noise in complex image regions where pixel values change significantly from pixel to pixel.

The flatness detector logic 360 finds the maximum and minimum luma values in the neighborhood of the current pixel. The current pixel is assigned a "1" when the absolute difference between these two values is less than a threshold value, otherwise the current pixel is assigned a "0". Other values can be used. Flat regions are mapped into a flatness map. Flatness expansion logic 370 can expand the flatness map to extend beyond the actual flat regions to detect pixels near the flat regions that may contain noise. The flatness map is expanded similar to the edge map. The intersection of the expanded flatness map and the edge map can be analyzed to identify flat regions near strong edges.

The expansion ranges for the major, minor and flatness expansions may be programmable values. The ranges of expansion for the major, minor and flatness expansions may be different ranges. The ranges of expansion may depend on the type of image being expanded. For example, high definition (HD) images may have different expansion ranges than for a video home system (VHS) image.

Figure 5:
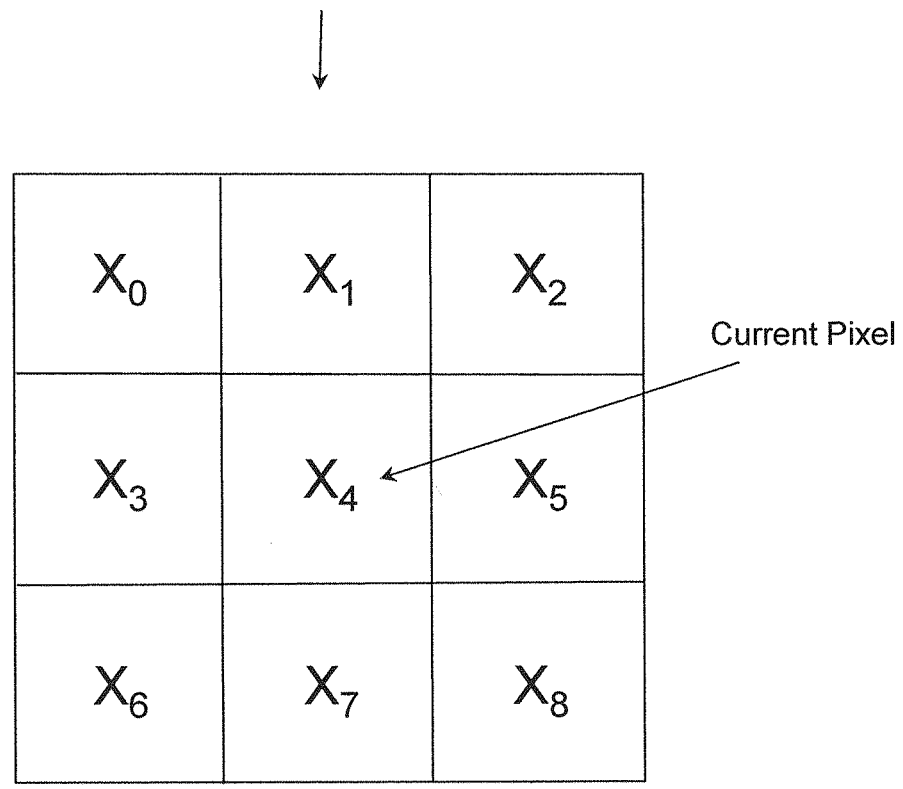
FIG. 5 illustrates one example of the pixels used by a ringing detector.

Ringing detection logic 380 detects mosquito noise. A 3×3 neighborhood of a current center pixel being analyzed by the ringing detector logic 380 is used as shown in FIG. 5. The ringing detection logic 380 outputs mosquito noise value for pixels as an eight bit value. The output of the ringing detection logic 380 for the current center pixel is ringing strength rs:

$$rs = \max(rs_{08}, rs_{17}, rs_{26}, rs_{35}) \quad \text{EQ1}$$
where $$rs_{ab} = \begin{cases} \dfrac{d_a + d_b}{2}, & d_a d_b > 0 \\ 0, & \text{otherwise} \end{cases} \quad \text{EQ2}$$

The differences $d_i = x_i - x_4$ are the differences between each pixel with the current center pixel. As shown in FIG. 5, an $rs_{08}$ value is calculated using the upper left pixel $X_0$ and the lower right pixel $X_8$ relative to the center pixel $X_4$. An $rs_{17}$ value is calculated using the pixel $X_1$ above the center pixel $X_4$ and the pixel $X_7$ below the center pixel $X_4$, and so on.

The mosquito noise level of the pixels is determined by multiplying three values. The three values are acquired from the final edge map, the expanded flatness map, and the mosquito noise from the ringing detection logic 380. The resulting value is sent to the output generator logic 270 of FIG. 2 where filtering is performed to reduce the mosquito noise.

In one embodiment, the mosquito noise detect logic 300 may be automatically enabled when block noise is detected. When block noise is not detected, mosquito noise is not reduced, which preserves good quality video where no block noise is found.

Block Noise Detection

Figure 6:
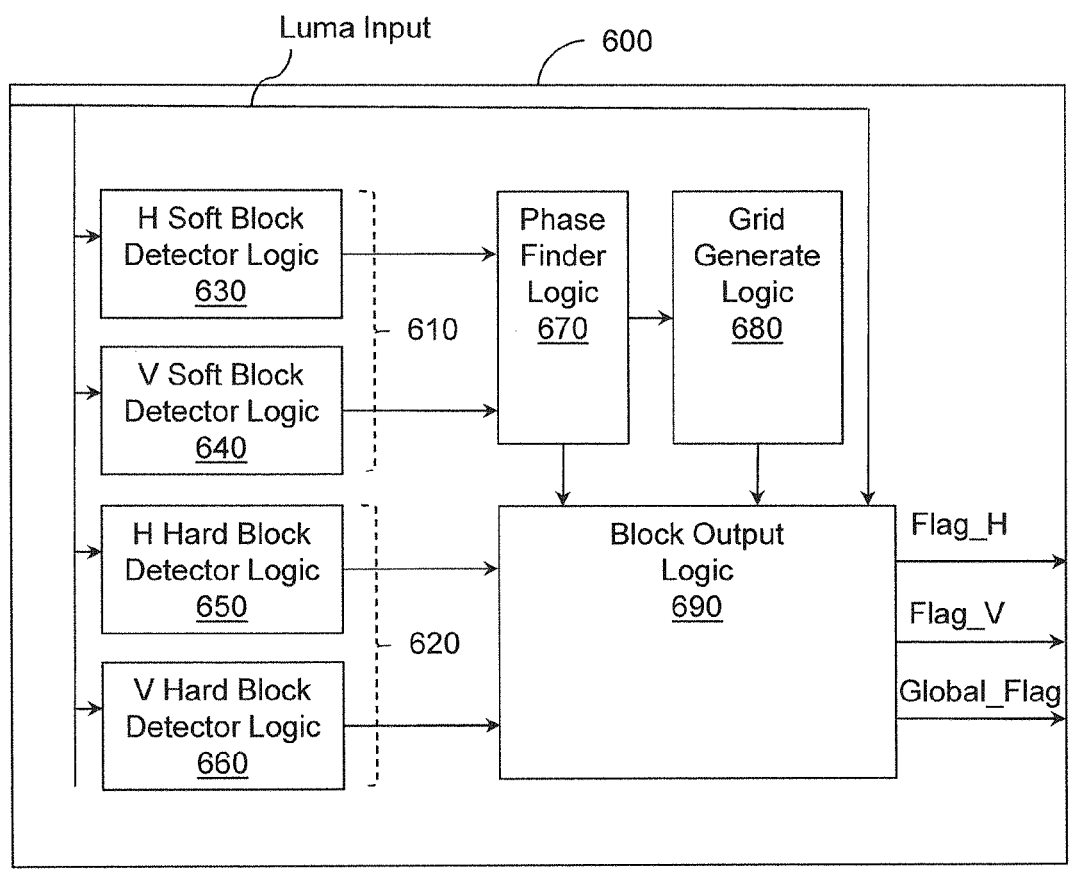
FIG. 6 illustrates one embodiment of a logic associated with detecting block noise.

An embodiment of a block noise detect logic 600 is shown in FIG. 6. Block noise detect logic 600 determines the edges of blocks used to form a compressed image. In general, images are formed with macro blocks. Macro blocks are squares of 16×16 pixels. In some block encoding standards, the macro block may be composed of smaller sub-blocks. Macroblocks allow individual frames of an image to be compressed with less data when the image data does not significantly change from frame to frame. Detailed areas are formed with smaller sub-blocks while flat areas are formed with larger sub-blocks.

Block noise occurs when a viewer of the image is able to see individual block edges of the blocks used to encode the image. Block noise is becoming a greater issue as video screens become larger and include the ability to generate higher resolution images. Block noise may occur around blocks of the entire image or around a portion of the blocks in the image. When block noise occurs throughout the image, the image is called blocky.

There are two types of pixel level block boundary detectors, a soft detector 610 and a hard detector 620. Hard detector 620 detects hard block boundaries while soft detector 610 detects softer boundaries. Hard boundaries differ from soft boundaries in their severity. Outputs from the hard detector 620 are used for individual block pixel filtering while outputs from the soft detector 610 generate output flags for a block grid across the entire image using statistical analysis. The soft detector 610 and the hard detector 620 differ in that they are programmed differently with different threshold values. The hard detector 620 can filter individual blocks when a block is determined to be not blocky across a whole image. The soft detector 610 includes H soft block detector logic 630 and V soft block detector logic 640. The H soft block detector logic 630 detects block boundaries in the horizontal direction and the V soft block detector logic 640 detects block boundaries in the vertical direction.

Hard detector 620 includes H hard block detector logic 650 and V hard block detector logic 660. The H hard block detector logic 650 detects block boundaries in the horizontal direction and the V hard block detector logic 660 detects block boundaries in the vertical direction. The hard detector outputs are used by the output generator logic 270 of FIG. 2 when the image is not blocky. The hard detector outputs are provided to the block output logic 690.

Figure 7:
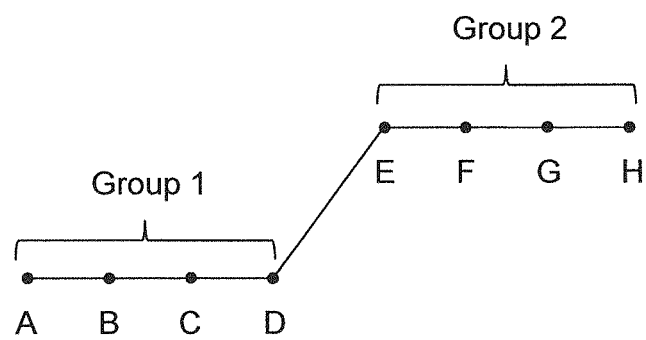
FIG. 7 illustrates one example of the pixels used by a block detector.

FIG. 7 illustrates how a vertical block boundary is detected. FIG. 7 shows eight adjacent pixels (A-H) from a line in the digital image. With the current pixel D, the block noise detect logic 600 determines whether there is a block boundary between pixels D and E. The block boundary is determined by grouping the eight pixels into two groups. The two groups of pixels are assumed to lie on either side of the block boundary. The block noise detect logic 600 evaluates comparisons for four block conditions:

1. Flatness condition (1):
   a. max(A, B, C, D)−min(A, B, C, D)<threshold1 and
   b. max(E, F, G, H)−min(E, F, G, H)<threshold1
2. Flatness condition (2):
   a. |A−B|<threshold2 and
   b. |B−C|<threshold2 and
   c. |C−D|<threshold2 and
   d. |E−F|<threshold2 and
   e. |F−G|<threshold2 and
   f. |G−H|<threshold2 and
3. Difference condition (1):
   a. |mean(A, B, C, D)|−|mean(E, F, G, H)|>threshold3
4. Difference condition (2):
   a. |D−E|>threshold4

A, B, C, D, E, F, G, and H represent pixels with corresponding pixel values. Pixels A, B, C, and D are associated with a first block, and pixels E, F, G, and H are associated with a second block. The first threshold, second threshold, third threshold, and fourth threshold are programmable values. The first threshold, second threshold, third threshold, and fourth threshold are programmable based on an image format the apparatus 900 is processing. The comparisons can be weighted in order to scale how much of a contribution a particular comparison makes to the detection of block noise.

The flatness conditions are intra-group while the difference conditions are inter-group. All four conditions do not need to be satisfied to detect a block boundary. However, one flatness condition and one difference condition are generally sufficient to detect a block boundary. Pixels satisfying these conditions are labeled as block boundary pixels (D and E). To improve the detection, adjacent lines of pixels can be used to validate the results because block boundaries are continuous across lines. The horizontal block boundary is determined in a similar manner except that pixels considered in the determination are selected from a column of pixels. The horizontal soft detector logic 630 and vertical soft detector logic 640 pass 1-bit flags to the phase finder logic 670. A high value for each flag indicates a block boundary is detected.

The block noise detect logic 600 may be programmed with different thresholds depending on the type of image being processed. For example, high definition (HD) images may have different thresholds for block boundary counts than for a video home system (VHS) image. Block detectors 630, 640, 650, and 660 may be programmed to give different weights to the block conditions discussed above. For example, flatness condition (1) and differencecondition (1) may be given a higher weight than other block conditions.

In one embodiment, phase finder logic 670 finds a blocky frame. A blocky frame is a frame that has a distinguishable block boundary between a significant number of blocks in an image. In one embodiment, a blocky image will be block filtered over the entire image. In one example, a compression algorithm encodes the image with block boundaries of 8×8 pixels. Block boundaries are formed at regular intervals of 8 pixels when the blocks are 8×8 blocks.

In one embodiment, the phase finder logic 670 counts the number of block boundary detections at specific phases of an image. For the 8×8 block example, the phase finder logic 670 has a eight 3 bit phase counters. The 3 bit phase counters are synchronized in the horizontal and vertical directions with respect to different phases of the image processed by phase finder logic 670. When a block boundary is detected, a relevant phase counter is incremented. The relevant phase counter may be determined by whether a horizontal boundary or a vertical boundary was detected, and at what phase the boundary was detected. At the end of a frame, there is vertical blank time. Thus, at the end of a frame, the phase counters are evaluated. A high value in one of the phase counters coupled with low values in the other seven phase counters indicate a blocky frame is detected. Additionally, a blocky frame can be detected when the difference between the highest phase counter and the second highest phase counter is greater than a programmable threshold. H and V information is latched during the blank time.

When an image is blocky, it will be filtered. Grid generate logic 680 uses the phase information that was latched during the blank time to generate output flags for filtering the frame that is currently being processed on a pixel basis. The output flags are used to create a block grid. The block grid is used to filter the frame that is currently being processed. Filtering the frame with a grid of blocks provides for block filtering over the whole frame. Traditional filtering that looked for individual block boundaries would not detect a block boundary when the pixel values at the block boundary did not vary enough to detect a block boundary. Generating a block grid assures that blocks that are too weak to be detected are still filtered as part of the block grid that spans the image.

In one embodiment, when an input pixel phase matches the stored blocky phase, block output logic 690 will set one or both of a corresponding flag_h or flag_v signal to high. If the pixel corresponds to a pixel on the corner of a block, then flag_h and flag_v are both set to high. The flag_h and flag_v signals are passed to the output generator logic 270 of FIG. 2 for filtering. The flag_h or flag_v values are provided to the block output logic 690. If the frame associated with the phase counter values that determined the flag_h or flag_v values was not stored with a frame buffer, then the flag_h or flag_v values can be applied to the next frame to be processed. The latency between frames is usually tolerable since block phases are fixed for a video session.

In one embodiment, the phase finder logic 670 and grid generate logic 680 provide for adaptive block noise detection. Traditional pixel level detection cannot detect each and every block boundary because the nature of the block boundary varies and is not easy to model. Also, block detector signals may incorrectly detect image features as block boundaries. If a traditional pixel level indicator alone is used, some block boundaries may not be filtered and some image features may be incorrectly filtered. In one embodiment, if no block grid is detected, no further block filtering is performed. This adaptability of the block noise detect logic 600 preserves non-blocky image material while cleaning blocky material.

In one embodiment, hysteresis is introduced to keep the block filtering on for a certain number of frames even when a blocky image is not detected. This is useful because a few intermittent frames may not be detected as being blocky while the majority of frames are detected as blocky. Hysteresis keeps the global block filtering set to on for these frames by using the last latched block phase values. Using hysteresis improves the consistency of the detection of blockboundaries. In another embodiment, a frame may be classified as blocky if a threshold amount of previous frames were determined as blocky.

In another embodiment, the difference between highest and second highest accumulator values in H and V directions are used to generate a multi-bit level of blockiness in the input frame. A high difference value may indicate very blocky frames while lower values would indicate less blockiness. Different filtering options can be used for each level of blockiness. For example, the whole frame is filtered when the frame has a high level of blockiness. For another level of blockiness, the pixels on the grid generated by the grid generate logic 680 are filtered. The grid pixels that are detected as block boundaries by H hard block detector logic 650 and V hard block detector logic 660 are filtered for blockiness below a threshold that indicates a low blockiness level. The grid pixels that are detected by H soft block detector logic 630 and V soft block detector logic 640 are filtered for blockiness below another threshold.

In one embodiment, the detection of a grid by the phase finder logic 670 in one direction is dependent on the detection of a grid in the other direction. For example, detection of vertical block boundaries may be difficult to detect due to prior horizontal filtering. As a result, the vertical grid can be turned on based, at least in part, on the horizontal grid being detected by the phase finder logic 670.

In another embodiment, the apparatus 200 accounts for the condition that some compression schemes have variable block sizes. The phase finder logic 670 looks for more than one high value in the phase accumulators and form grids corresponding to the phase accumulators with high values. For example, for digital images that have block sizes of 4 and 8, two maxima may be found in the accumulators and hence two grids may be formed based on the detected maximum accumulator values.

Output Generator Logic

Returning to FIG. 2, the output generator logic 270 computes the luma output using the detected grid and filtered image values, in one embodiment. For pixels that are detected as being degraded by mosquito noise without block noise, the luma output is formed by blending the 2D filter mosquito filter output with the original luma. The blending is controlled by a blending factor that is the noise level indicated by the mosquito noise detect logic 300 of FIG. 3. For pixels with a high noise level, the filter output has a higher weight than the original luma. For pixels with a low noise level, the filter output has a lower weight than the original luma.

For pixels that are degraded by block noise and not mosquito noise, the output is the 1D H filter logic 250 output for vertical block boundary pixels and the 1D V filter logic 260 output for horizontal block boundary pixels. For corner pixels, either the horizontal and vertical filtered pixel values are selected. For these pixels, the output is selected to be the output of the 1D filter that affects the greater change in pixel value. Edge adaptive 1D filters are preferred over linear filters because edge adaptive filters will preserve strong image features that may lie on the block grid. This also preserves on screen display (OSD), letterboxes, mixed material, and so on.

For pixels that are affected by both mosquito noise and block noise, a selection is made between the 2D mosquito filter logic output and the 2D block filter logic output. This ensures that the final picture is free from abrupt jumps in pixel values that may cause grid like artifacts. The 2D block filter logic output is used when the image is blocky. In one embodiment, the mosquito noise filtering may be turned off when the image is not blocky.

Figure 8:
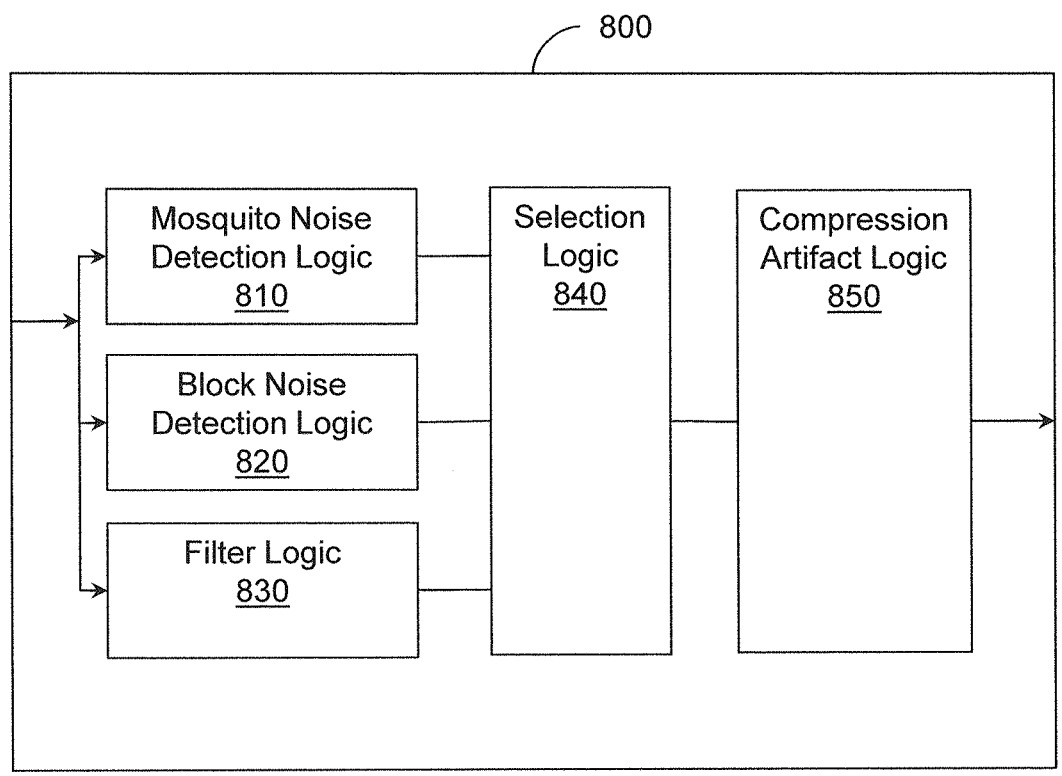
FIG. 8 illustrates another embodiment of an apparatus associated with reducing digital image noise.

FIG. 8 illustrates one embodiment of an apparatus 800 associated with reducing digital image noise. The apparatus 800 is adaptive to filter noise in regions associated with block boundaries. The apparatus 800 is adaptive because areas of the digital image that contain artifacts are filtered and areas that do not contain artifacts are not filtered. As discussed above, two types of artifacts include mosquito noise and block noise.

In one embodiment, the apparatus 800 comprises mosquito noise detection logic 810 to detect an amount of mosquito noise present in a digital image, where the digital image is comprised of pixels. Block noise detection logic 820 detects an amount of block noise present in the digital image. As discussed above, the block noise detection logic 820 may first detect whether horizontal or vertical block boundaries are present. In one embodiment, the mosquito noise detection logic 820 generates an eight bit value to represent the amount of mosquito noise.

In one embodiment, the mosquito noise detection logic 820 detects a directional edge. The mosquito noise detection logic 810 expands the directional edge with a major expansion and a minor expansion as discussed above. The expansions confine possible mosquito noise to regions near strong directional edges. The major expansion and the minor expansions form an edge map.

The mosquito noise detection logic 810 determines a flat region of the digital image corresponding to the edge map. A flat region, as discussed above, is an image region where pixels values do not change significantly between adjacent pixels. The mosquito noise detection logic 810 determines mosquito noise magnitudes corresponding to the pixels in the flat region of the edge map. The mosquito noise is determined by the mosquito noise detection logic 810 multiplying together the mosquito pixel values corresponding to the edge map, pixel values corresponding to the flat region, and the pixel values of mosquito noise magnitude.

In one embodiment, the edge map is an area of pixels around the directional edge. A directional edge is the edge where a block boundary is detected. Pixels on the directional edge are not included in the edge map. The major expansion defines pixels on the outer edge of the edge map and the minor expansion defines pixels on the inner edge of the edge map.

In one embodiment, the block noise detection logic 820 detects the amount of block noise present by determining whether a horizontal block boundary is present in the digital image. A determination is made as to whether a block phase is present in the digital image. The presence of a block phase indicates that a horizontal block boundary repeats at a periodic interval. The phase corresponds to the number of pixels in a horizontal block edge. For example, there would be 16 phases corresponding to sixteen possible horizontal block edge locations when a digital image is encoded with a 16×16 block of pixels as the largest block size. A horizontal block boundary is determined based, at least in part, on the pixels of at least one vertical column of pixels in the digital image as discussed above.

The block noise detection logic 820 determines a vertical block boundary similar to how the horizontal block boundary is detected. A vertical accumulator corresponding to a phase of the vertical block boundary is increased when a vertical block boundary is detected. A vertical block boundary is determined based, at least in part, on at least one horizontal row of pixels in the digital image as discussed above.

The block noise detection logic 820 generates a block grid of the digital image based, at least in part, on the horizontal accumulator values and the vertical accumulator values. When a difference between accumulator values exceeds a threshold, a grid of block edges corresponds to the phase represented by the accumulator containing the greatest value. The block boundaries across the image in the vertical and horizontal direction will repeat in a regular pattern corresponding to the phase because a regular array of blocks is used to encode an image.

In another embodiment, the apparatus 800 generates a grid based, at least in part, on the horizontal and/or vertical block phases. The grid may be based on other parameters other than the horizontal and vertical block phases. The grid corresponds to pixels of the digital image and block boundaries of the blocks used to compress the digital image.

The apparatus 800 comprises filter logic 830 configured to filter the digital image. The filter logic 830 produces a 2-dimensional (2D) mosquito filter output, a 2D block filter output, a 1-dimensional (1D) horizontal block filter output, and a 1D vertical block filter output. As discussed above, the 2D mosquito filter output and the 2D block filter output are the outputs resulting from filtering the entire digital image. The 1D horizontal and 1D vertical filter outputs are the result of filtering the image in a horizontal and a vertical direction respectively. In one embodiment, the filter logic 830 filters the pixel values based, at least in part, on a weighted average of pixel values.

The apparatus 800 comprises selection logic 840. Selection logic 840 will select, based at least in part on the amount of mosquito noise and the amount of block noise, a correction filter output to improve image quality. The correction filter outputs one or more of the 2D mosquito filter output, the 2D block filter output, the 1D horizontal block filter output, and the 1D vertical block filter output blended together. In one embodiment, the selection logic 840 selects the 2D mosquito filter output and the 2D block filter output when the image is blocky across the image. In another embodiment, the 1D horizontal block filter output and the 1D vertical block filters outputs are applied at detected block boundaries when the image is not blocky across the whole image.

Compression artifact logic 850 reduces the block noise and the mosquito noise compression artifacts in the digital image based, at least in part, on the correction filter output. In one embodiment, the compression artifact logic 850 reduces a compression artifact block noise in the digital image based, at least in part, on the block grid. For example, artifact noise is reduced when an image pixels is within a distance of the grid.

In one embodiment, the digital image is a current frame of video data. The selection logic 840 selects a correction filter output based, at least in part, on a past history of a set of previous frames of video data. The current frame is determined to be blocky when a threshold amount of previous frames (from a set of previous frames) is blocky. A blocky frame is one that has block noise throughout a significant portion of the blocky frame. For example, a frame may be a blocky frame when more than 50 percent of the possible block boundaries are detected. In one embodiment, the selection logic 840 selects the 2D block filter logic output to be the correction filter output when the current frame is blocky.

In one embodiment, the apparatus 800 is implemented in a chip. A chip is a set of micro-miniaturized electronic circuits fabricated on semiconductor material. The chip may be configured within an electronic device that processes images. In another embodiment, the chip is implemented to process digital images according to a selected standard. In one example, the standard may be the H.264 standard.

Figure 9:
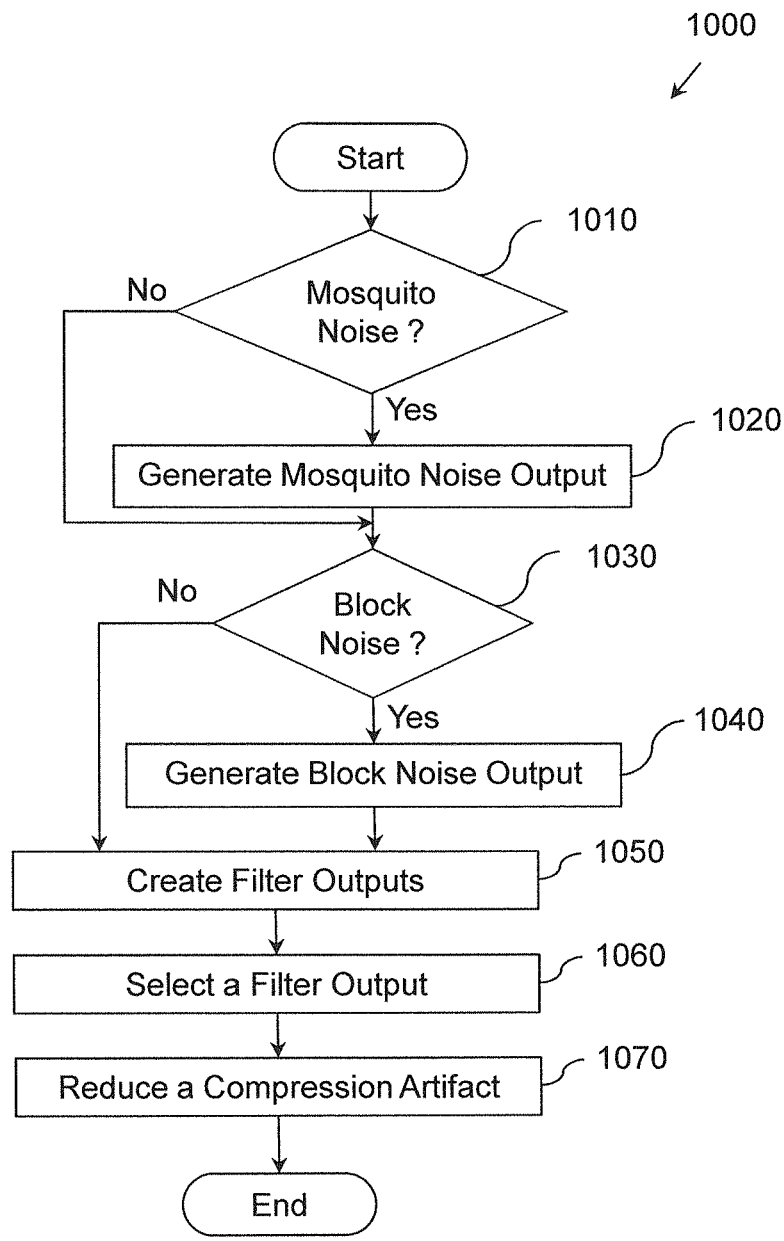
FIG. 9 illustrates one embodiment of a method associated with reducing digital image noise.

FIG. 9 illustrates an embodiment of a method 1000 associated with reducing digital image noise. The method 1000 may be associated with apparatus 200, and/or 800 (FIGS. 2 and 8 respectively) in some embodiments. This may also apply to other methods herein. The method 1000 may improve digital image quality by removing or at least reducing block noise and mosquito noise from a digital image. The method 1000 filters noise with adaptive filters that filter noise near block boundaries. The method 1000, or other methods herein, may be implemented in hardware, firmware, or a combination of hardware and firmware. In one embodiment, the method 1000 is implemented to be performed in a chip.

The method 1000 determines, at 1010, if mosquito noise is present in a digital image. The method 1000 may detect the mosquito noise near strong edges in flat image regions as discussed above.

At 1020, method 1000 creates a mosquito noise output that indicates a mosquito noise magnitude. In one embodiment, the mosquito noise magnitude is proportional to the mosquito noise detected. The mosquito noise magnitude may be generated by a ringing detector. Pixels with no mosquito noise may have a magnitude value of zero. In one embodiment, the mosquito noise output is created as an 8-bit value on a per pixel basis.

At 1030, the method 1000 determines if block noise is present in the digital image. As discussed above, the block noise may be determined near block boundaries. The block boundaries may be represented by a grid. The grid may be determined based, at least in part, on phase accumulators as discussed above.

A block noise output is generated at 1040. The block noise output represents a magnitude of block noise. The block noise output identifies the block noise and possible global block noise. Global block noise is comprised of horizontal block noise and vertical block noise throughout the digital image as discussed above.

Filter outputs are generated at 1050. In one embodiment, filter outputs may be created for a 2D mosquito filter, a 2D block filter, a 1D horizontal filter, and a 1D vertical filter, or other combinations. The filters are adaptive filters. Adaptive filters filter noise around block boundaries. The block boundaries can be determined as discussed above.

A correction filter output is selected at 1060. The correction filter output is selected to improve image quality. The correction filter output is a blend of at least one of, the 2D mosquito filter output, the 2D block filter output, the 1D horizontal filter output, and the 1D vertical filter output. The blend of filter outputs is based, at least in part, on the mosquito noise output and the block noise output.

At 1070, the method 1000 reduces a compression artifact in the digital image based, at least in part, on the correction filter output. For example, if the image is blocky with block boundaries detected throughout significant portions of the image, then the 2D mosquito filter output and/or the 2D block filter output are combined to filter the digital image. If the image is not blocky but has some block noise, then the 1D horizontal filter output and the 1D vertical filter output are combined to reduce artifact noise in the areas where block noise is detected. In one embodiment, the 2D mosquito filter output is not applied to reduce the compression artifact unless block noise has been detected. In another embodiment, the method 1000 reduces a compression artifact of a digital image compressed according to the H.264 standard.

In one embodiment, the digital image is a current frame of video data. The current frame may be a frame of data associated with a video data stream. There may be a history of prior frames of data. A certain number of specific frames of data may have been determined to be blocky with block data throughout the frames. Selecting the filter output is based, at least in part, on the history of a set of previous frames. The current frame is automatically determined to be blocky when a threshold amount of the previous frames are blocky.

Figure 10:
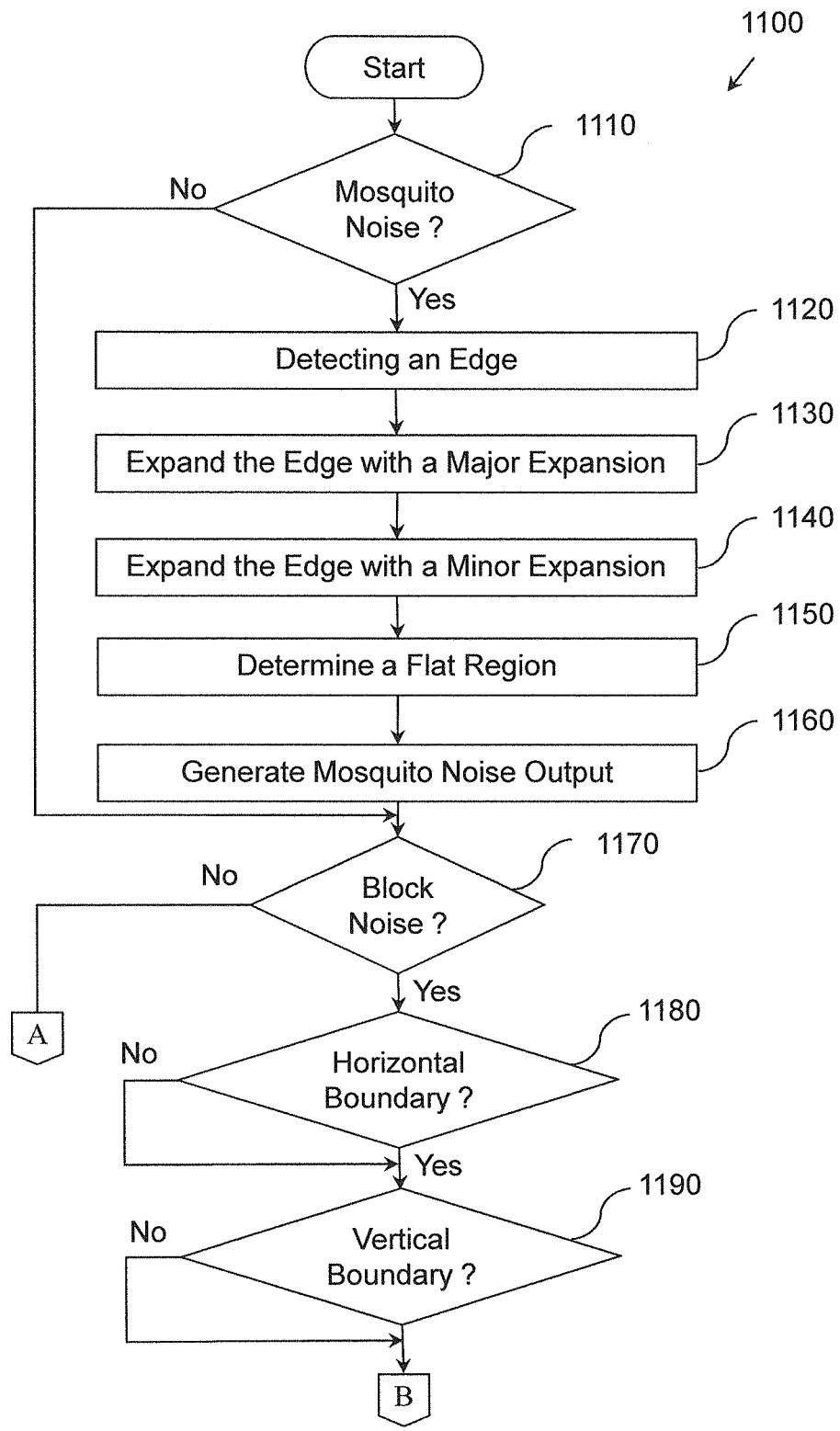
FIGS. 10 and 11 illustrate another embodiment of a method associated with reducing digital image noise.
Figure 11:
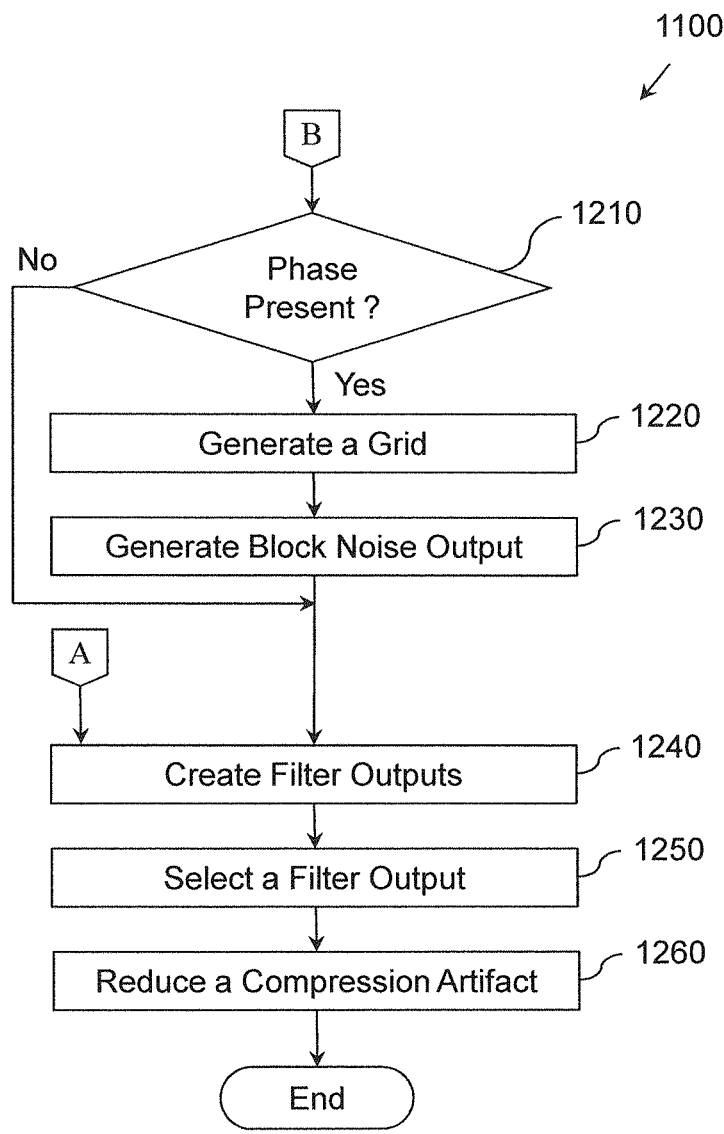

FIGS. 10 and 11 illustrate an embodiment of a method 1100 associated with reducing digital image noise from digital images. The method 1100 may improve digital image quality by removing or reducing block noise and mosquito noise from a digital image. The method 1100 filters noise with adaptive filters that filter noise near block boundaries. The method 1100 may be implemented in hardware, firmware, or a combination thereof.

When processing digital image data, the method 1100 determines, at 1110, if mosquito noise is present in the digital image. In one embodiment, the method 1100 may detect mosquito noise near strong edges in flat image regions as discussed above. The mosquito noise is detected by determining a directional edge at 1120. The directional edge is detected by analyzing the output of four directional filters.

The method 1100 expands the directional edge with a major expansion at 1130. The directional edge is expanded with a minor expansion at 1140. The major and minor expansions are performed to limit the detection of mosquito noise to regions near strong edges. The major and minor expansions are performed as discussed above and with reference to FIG. 4. Pixels in the major expansion and the minor expansion form an edge map.

At 1150, a flat region of the digital image corresponding to the edge map is determined. The flat region is a region where pixel values do not change significantly from pixel to pixel. Mosquito noise is correctable in flat regions but may not be corrected in more complex regions. The flat region may be determined as discussed above.

Mosquito noise output is generated at 1160 on a per pixel basis to compensate for mosquito noise. The mosquito noise outputs are generated by multiplying at least three values together. In one embodiment, the at least three values multiplied together are values corresponding to the edge map, values corresponding to the flat region, and magnitudes corresponding to the mosquito noise outputs. The mosquito noise outputs are used to filter the mosquito noise on a per pixel basis.

In one embodiment, the pixel value magnitudes are determined by a ringing detector. The ringing detector calculates ringing values of neighboring pixels of 3×3 regions. The pixel value magnitudes correspond to pixels in the center of the 3×3 regions as discussed above with reference to FIG. 5. In one embodiment, the ringing values may be calculated according to equations EQ1 and EQ2 as discussed above.

At 1170, the method 1100 determines if block noise is present in the digital image. As discussed above, the block noise may be determined by finding candidate block boundaries. To facilitate the detection of block noise a determination of whether a horizontal block boundary is present is made at 1180. A determination of whether a vertical block boundary is present is made at 1190. The horizontal and vertical boundaries may be determined by analyzing strings of pixels as discussed above with reference to FIG. 7.

A determination is made, at 1210, to determine whether a block phase is present in the digital image. A block phase indicates whether the horizontal block boundary repeats at a periodic interval and/or whether the vertical block boundary repeats at the periodic interval. The phase may be determined by incrementing accumulators while tracing a line of pixels as discussed above.

At 1220 a grid is generated based on the block phase. The grid corresponds to block boundaries and to pixels of the digital image. Pixel values that do not differ by a detectable amount at the block boundary make the block boundary difficult to detect. The grid allows block boundaries to be detected that normally are not detected.

At 1230, block noise outputs are generated. The block noise outputs are based, at least in part, on the grid and the pixel values of the digital image. The block noise outputs are determined on a pixel by pixel basis. For example, if the grid pixel corresponds to a pixel of the digital image, then the pixel of the digital image is filtered.

Filter outputs are generated at 1240 and correction filter output is selected, at 1250, similar to the filter output generation, at 1050, and the filter selection, at 1060, in FIG. 10. At 1260, the method 1100 reduces a compression artifact in the digital image based on the correction filter output. The method 1100 preserves areas of the digital image without block noise because these areas are not filtered. Areas without block noise are preserved because an area is filtered based, at least in part, on pixel locations to a block boundary and a flat region.

Figure 12:
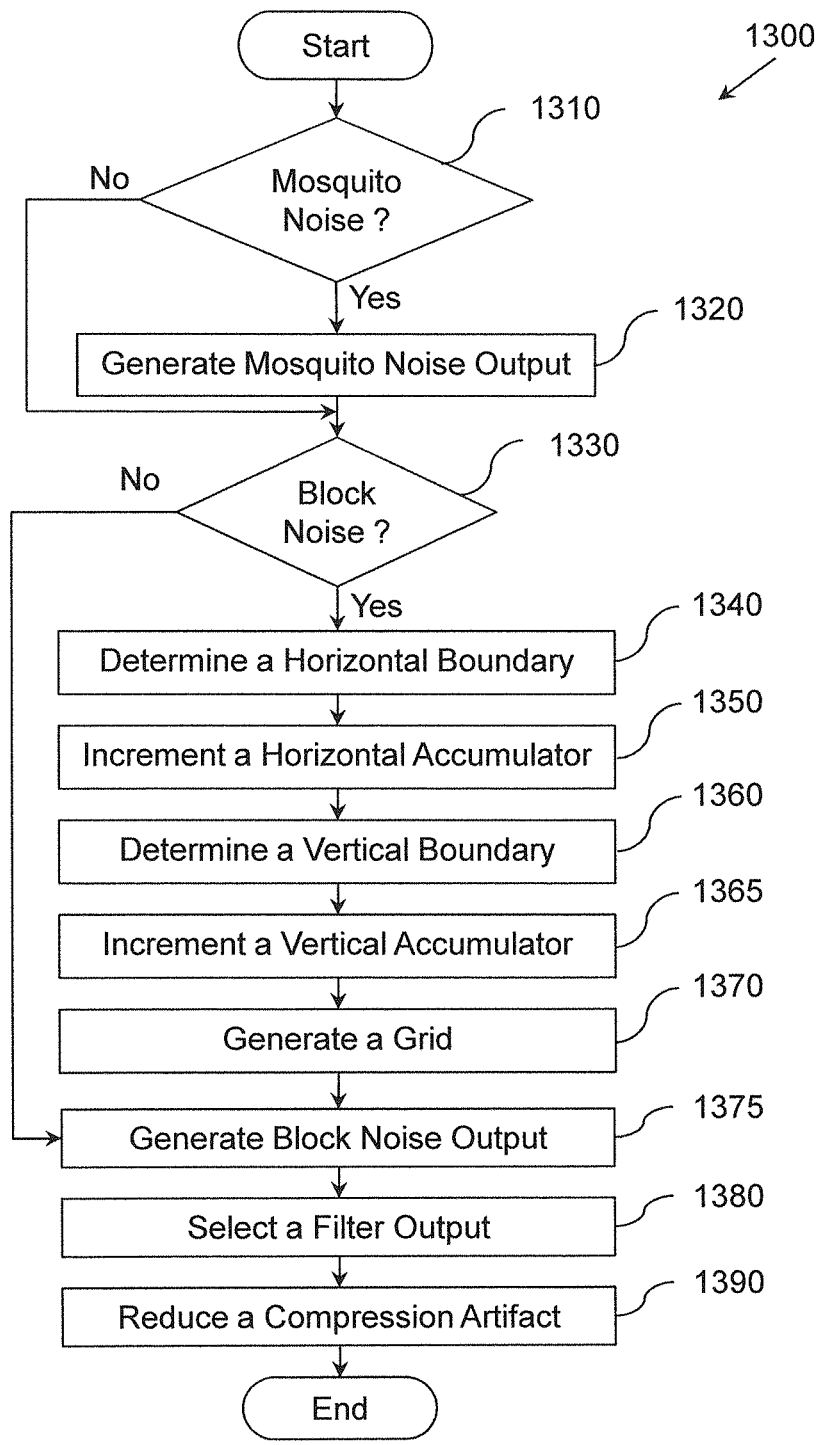
FIG. 12 illustrates another embodiment of a method associated with reducing digital image noise.

FIG. 12 illustrates an embodiment of a method 1300 associated with reducing digital image noise. The method 1300 may improve digital image quality by removing or at least reducing block noise and mosquito noise from a digital image.

The method 1300 determines, at 1310, if mosquito noise is present in a digital image. The method 1300 detects the mosquito noise near strong edges in flat regions as discussed above.

The method 1300, at 1320, creates a mosquito noise output that indicates a mosquito noise magnitude when mosquito noise is present. The mosquito noise magnitude may be proportional to the mosquito noise detected. The mosquito noise magnitude may be generated by the ringing detector. Pixels with no mosquito noise may have a magnitude value of zero. In one embodiment, the mosquito noise output is created as an 8-bit value on a per pixel basis.

At 1330, the method 1300 determines if block noise is present in the digital image. The block noise determination, at 1330, is similar to the block noise determination, at 1030, of FIG. 10 discussed above.

A horizontal block boundary is determined at 1340. The boundary may be determined based a line of pixels as discussed above. In one embodiment, the horizontal block boundary is determined based on the pixels of at least one vertical column of pixels in the digital image. A horizontal accumulator corresponding to a phase of the horizontal block boundary is incremented, at 1350.

A vertical block boundary is determined at 1360. In one embodiment, the vertical block boundary is determined based on the pixels of at least one horizontal row of pixels in the digital image. A vertical accumulator corresponding to a phase of the vertical block boundary is incremented, at 1365.

The method 1300 generates a block grid of the digital image at 1370. The grid is generated based, at least in part, on the horizontal accumulator values and the vertical accumulator values. The grid is generated when the digital image is blocky so that the blocks representing the digital image are detected and the noise near those block boundaries is detected. In one embodiment, flat regions are detected as discussed above and pixels in the flat regions are filtered.

Block noise outputs are generated at 1375. In one embodiment, block noise outputs are created with a 2D mosquito filter, a 2D block filter, a 1D horizontal filter, and a 1D vertical filter as discussed above. The filters are adaptive filters. Adaptive filters filter noise around block boundaries.

A correction filter output is selected at 1380. The correction filter output selection is based, at least in part, on the block grid. The correction filter output is selected to improve image quality. In one embodiment, the correction filter output is a blend of the outputs from the 2D mosquito filter, the 2D block filter, the 1D horizontal filter, and the 1D vertical filter. The blend of filter outputs is based, at least in part, on the mosquito noise output and the block noise output.

At 1390 the method 1300 reduces a compression artifact in the digital image based on the correction filter output. The artifacts in the digital image are reduced on a pixel by pixel basis. The artifacts are reduced based, at least in part, on the grid and whether the pixel is in a flat region near a strong edge. The method 1300 filters noise near block boundaries without affecting image regions unlikely altered by block noise or mosquito noise.

Figure 13:
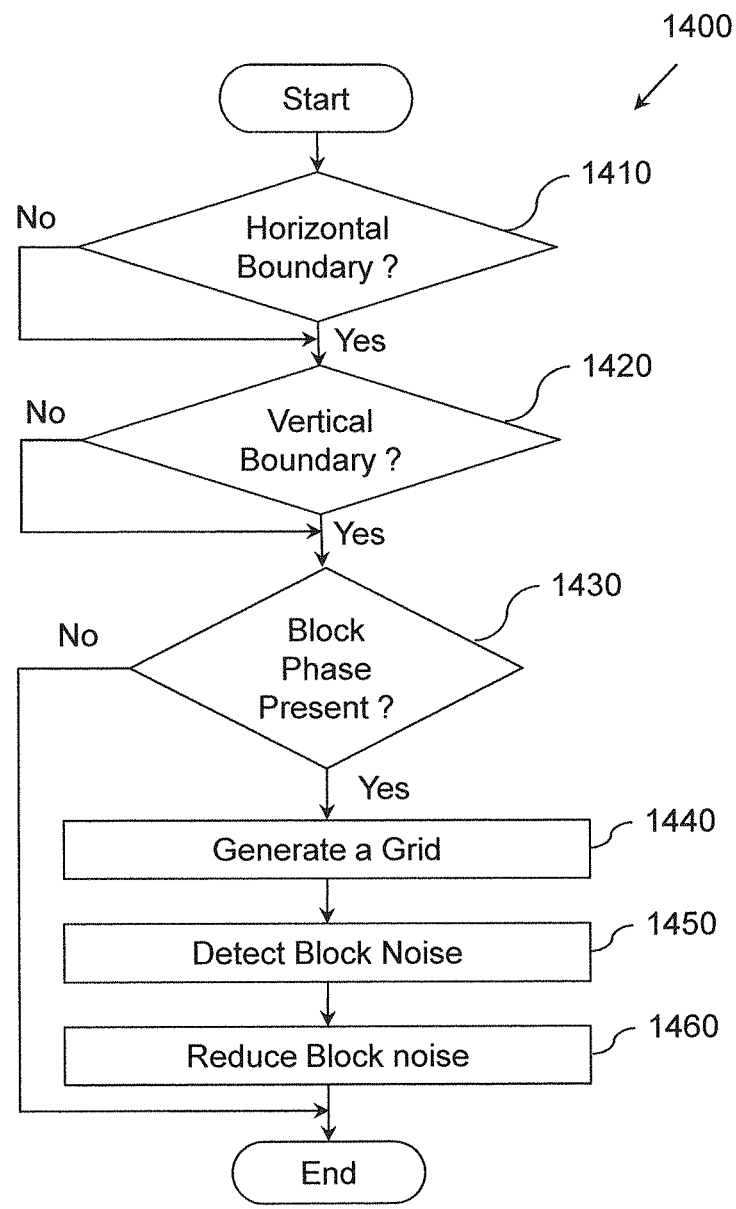
FIG. 13 illustrates another embodiment of a method associated with reducing digital image noise.

FIG. 13 illustrates another embodiment of a method 1400 associated with reducing digital image noise. The method 1400 may improve digital image quality by removing or at least reducing block noise and mosquito noise from a digital image.

The method 1400 detects whether a horizontal block boundary is present, at 1410, in a digital image represented by a grid of pixels. At 1420 a determination is made to detect whether a vertical block boundary is present. The horizontal and vertical block boundaries are determined as discussed above.

A determination is made at 1430 to determine whether a block phase is present in the digital image. The block phase indicates whether the horizontal block boundary repeats at periodic intervals, and whether the vertical block boundary repeats at the periodic interval. The block boundary is determined as discussed above.

At 1440 a grid is generated based on the block phase. The grid is generated as discussed above. The grid corresponds to pixels of the digital image and spans the digital image. The pixels on the grid represent block boundary pixels.

The method 1400 detects an amount of block noise at 1450. The block noise is detected as discussed above. Block noise is detected based, at least in part, on the grid and the pixels of the digital image.

At 1460 a block noise compression artifact in the digital image is reduced. The artifact is reduced based, at least in part, on the detected amount of block noise as discussed above. The method 1400 reduces the artifacts based on horizontal block boundaries, vertical block boundaries, and a grid.

Figure 14:
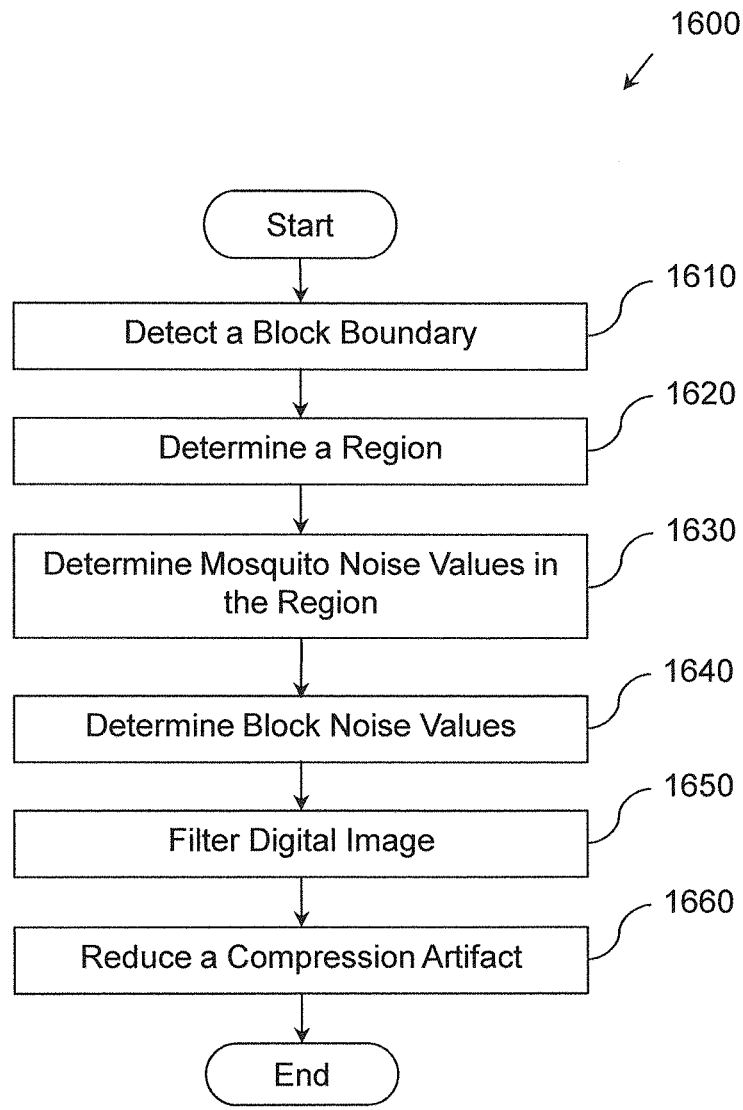
FIG. 14 illustrates another embodiment of a method associated with reducing digital image noise.

FIG. 14 illustrates another embodiment of a method 1600 associated with reducing digital image noise. The method 1600 may improve digital image quality by removing or reducing mosquito noise adjacent to block boundaries of a digital image.

The method 1600 detects a block boundary at 1610. The block boundary may be detected by analyzing horizontal and vertical strings of pixels as discussed above. The block boundary is detected because mosquito noise is associated with block boundaries.

At 1620, the method 1600 determines a region of possible mosquito noise adjacent to the strong directional edge. The region may be a flat region with insignificant pixel value change between adjacent pixels as discussed above. The mosquito noise is correctable in flat regions without affecting other areas that do not contain mosquito noise. The mosquito noise values are determined, at 1630, for the pixels in the region of possible mosquito noise.

A block noise is detected, the digital image is filtered, and a compression artifact is removed at 1640, 1650, and 1660 respectively. The block noise is detected, the digital image is filtered, and a compression artifact is removed as discussed above with reference to FIG. 15 at 1520, 1530, and 1540.

It will be appreciated that in one embodiment, the methods herein may be implemented as computer executable instructions embodied and stored on a computer-readable medium. When executed by a machine (e.g., processor, device) the instructions cause the machine to perform the methods herein or their equivalents. The methods can also be implemented with circuits. The methods described herein are limited to statutory subject matter under 35 U.S.C. §101.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A method, comprising:
    filtering a digital image with a plurality of adaptive filters, wherein the plurality of adaptive filters include
        a first filter configured to filter noise surrounding one or more edges in the digital image, and
        a second filter configured to filter noise caused by a block-based encoding of the digital image; and
    reducing a compression artifact from selected pixels in the digital image, wherein the compression artifact is reduced by
        (i) combining an output from the first filter and an output from the second filter in response to the digital image being determined to be blocky, and
        (ii) not combining the output from the first filter with the output of the second filter in response to the digital image not being determined to be blocky;
    wherein the first filter is configured to filter noise surrounding one or more edges in the digital image by determining mosquito noise values for pixels from the digital image by:
    determining a flat region of the digital image within the first region;
        within the flat region, determining pixels having a mosquito noise magnitude exceeding a mosquito noise threshold; and
        generating the mosquito noise values for the pixels in the first region based at least in part on the pixels having the mosquito noise magnitude exceeding the mosquito noise threshold.

2. The method of claim 1, wherein the first filter is further configured to determine the mosquito noise values by:
    detecting an edge in the digital image;
    determining the first region adjacent to the edge detected in the digital image; and
    determining the mosquito noise values for pixels in the first region.

3. The method of claim 1, wherein the first filter is a 2-dimensional (2D) mosquito filter, and the second filter is a 2-dimensional (2D) block filter, and wherein the plurality of adaptive filters further includes a 1-dimensional (1D) horizontal block filter, and a 1-dimensional (1D) vertical block filter; and
    wherein the compression artifact is reduced by combining an output of one or more of the plurality of adaptive filters.

4. The method of claim 1, further comprising determining whether the digital image is blocky by determining that the digital image has block noise throughout the digital image.

5. An apparatus, comprising:
    a plurality of adaptive filters including at least
        a first filter configured to filter noise surrounding one or more edges in the digital image, and
        a second filter configured to filter noise caused by a block based encoding of the digital image;
    mosquito noise detection logic configured to detect an amount of mosquito noise present in a digital image;
    block noise detection logic configured to detect an amount of block noise present in the digital image to determine if the digital image is blocky; and
    compression artifact logic configured to reduce a compression artifact from selected pixels in the digital image, wherein the compression artifact is reduced by
        (i) combining an output from the first filter and an output from the second filter in response to the digital image being determined to be blocky, and
        (ii) not combining the output from the first filter with the output of the second filter in response to the digital image not being determined to be blocky;
    wherein the block noise detection logic is configured to detect the amount of block noise present by:
        determining a horizontal block boundary based, at least in part, on one vertical column of pixels in the digital image;
        incrementing a horizontal accumulator corresponding to a phase of the horizontal block boundary;
        determining a vertical block boundary where the vertical block boundary is determined based, at least in part, on at least one horizontal row of pixels in the digital image;
        incrementing a vertical accumulator corresponding to a phase of the vertical block boundary; and
        generating a block grid of the digital image based, at least in part, on horizontal accumulator values and vertical accumulator values, where the block noise detection logic is configured to detect the amount of block noise based, at least in part, on the block grid, and pixels of the digital image.

6. The apparatus of claim 5, wherein the plurality of adaptive filters further include a 1-dimensional (1D) horizontal block filter for filtering the digital image and a 1-dimensional (1D) vertical block filter for filtering the digital image; and
    wherein the first filter is a 2-dimensional (2D) mosquito filter and the second filter is a 2-dimensional (2D) block filter, wherein each filter of the plurality of adaptive filters is configured to provide a correction filter output as a result of filtering the digital image.

7. The apparatus of claim 6, further comprising selection logic configured to select the correction filter outputs from one or more of the plurality of adaptive filters, wherein the selection is based at least in part on the amount of mosquito noise determined from the digital image and the amount of block noise determined from the digital image.

8. The apparatus of claim 6, further including filter logic configured to filter the digital image to produce at least one of, a 2-dimensional (2D) mosquito filter output, a 2-dimensional (2D) block filter output, a 1-dimensional (1D) horizontal block filter output, and a 1D vertical block filter output from a combination of the correction filter outputs selected from the plurality of adaptive filters.

9. The apparatus of claim 5, further comprising selection logic configured to determine if a current frame from the digital image is blocky when the current frame has block noise throughout the current frame.

* * * * *